Dec. 29, 1970    D. L. DYER    3,551,295

MICROBIOLOGICAL DETECTION AND IDENTIFICATION SYSTEM

Filed Nov. 29, 1967

TO SCANNER

INVENTOR.
DENZEL L. DYER
BY
SOKOLSKI & WOHLGEMUTH
ATTORNEYS

United States Patent Office

3,551,295
Patented Dec. 29, 1970

3,551,295
MICROBIOLOGICAL DETECTION AND IDENTIFICATION SYSTEM
Denzel L. Dyer, Palos Verdes Peninsula, Calif., assignor to Northrup Corporation, Beverly Hills, Calif., a corporation of California
Filed Nov. 29, 1967, Ser. No. 686,596
Int. Cl. C12k 1/00
U.S. Cl. 195—103.5         10 Claims

ABSTRACT OF THE DISCLOSURE

A tape comprised of a suitable substrate material coated with a gel such as agar, having a plurality of separate adjacent tracks thereon. Each track of the gel coated tape contains a different fluorogen such that when the tape is exposed to an environment and subsequently passes through a fluorescent scanning device, a count can be obtained of the fluorescent reactions occurring in each individual track. Since each bacterial species will have a different reaction pattern, one can identify the species by determining what substances of those on the various tracks fluoresced, indicating reaction.

---

Specification identification of microorganisms is extremely important in various areas. For example, the identification of various bacterial would be important in military defense against bacterial attack, public health work, spacecraft sterilization, planetary life detection experiments, individual medical treatment and hospital detection work. The present techniques for detecting microorganisms are generally unsatisfactory. The existing techniques are either very slow, nonspecific, or logistically impractical.

One of the basic methods for identification of bacteria and for determination of their numbers has been through analyzing metabolic activity. In measuring the metabolic process, the reducing activity of the bacteria in particular has been employed. For example, measurements of methylene blue or resazurin reduction have been employed as indicators of bacterial contamination in milk. Resazurin has been previously used in rapid tests for antibiotic sensitivity where the sensitivity is indicated by a red color in the oxidized form, while in the absence of sensitivity the dye is reduced to a colorless form. Prior extremely sensitive measuring techniques for measuring enzyme activity have employed fluorogenic materials. These methods have used resazurin, resorufin esters, indoxyl esters, and fluorescein esters. The fluorescent activity is carried out in these techniques in a free solution normally in test tubes or the like. A method most closely allied to the one of the herein invention has utilized a moving tape of glass or such which has a fluorescent antibody staining material coated thereon. Normally, it is sprayed as a liquid on the tape. The tape then moves past a fluorescent antibody scanning device which can count the number of bacteria affected by the antibody. This technique has only used a fluorescent antibody staining composition which adheres to the bacteria. The tape is then washed and the nonadhering stain is removed leaving a pattern of fluorescent spots where the stain has recognized a specific bacterium. The above method is very specific in that the stain must contain the particular antibody for a certain bacterium. It does not enable the detection of several different species simultaneously.

One of the most prominent prior well-known techniques for identification of bacteria is based upon biochemical activity. Use has been made of wide recurring bacterial enzymes which can convert synthetic substrates to fluorescent compounds. Esters of beta-naphthol and of fluorescein are particularly useful in accomplishing this. The extreme sensitivity of the fluorescence analysis and the utilization of very small volumes of suspension make possible a relatively rapid detection of a few hundred thousand bacteria. However, all of these prior systems are aimed at merely detection and employ ubiquitous enzymes. They are therefore inherently nonselective and unable to differentiate between species and between pathogens and nonpathogens.

Thus, it is an object of this invention to provide a device and method for rapid detection of bacteria.

Another object of this invention is to provide a method and device for specific identification of bacteria in any of varying environments.

A further object of this invention is to provide a method and device for greater speed of measurement than present bacteria activity measuring techniques.

Still another object of this invention is to provide a method and device having broad applicability as opposed to the narrow specificity of immuno-chemical reactions.

Briefly, this invention comprises in a preferred embodiment the utilization of a tape of Mylar or suitable base material. For example, the tape can be a 35 mm. Mylar film base. The tape is provided with a plurality of individual adjacent tracks. For example, it could have eight separate tracks. This film or base material is coated with a suitable gel material for capturing bacteria, such as agar. The differentiation between the tracks would comprise a different fluorogenic composition in each track. A collector impacts air on a gel-coated tape or filters air or water through a membrane filter tape which is subsequently affixed to a gel coated plural track tape of this invention, thereby trapping the bacteria on the gel. The tape then proceeds to a processor which can, for example, be a heating block that maintains the optimum temperature for the reactions to be observed. The tape then passes to a scanner, which is a conventional existing device, which would observe each individual track. The scanner then may feed to a computer section which collects the counts of the fluorescent material in each track. It also compares the counts between the channels and uses response patterns to identify the organisms responsible for the counts. Additionally, the computer can then provide the necessary output signal. The invention is thus based upon the fact that a given organism would provide a certain pattern in the multiple track tape. For example, only one microorganism would reflect a pattern of reaction in tracks 1, 4 and 6. Thus, if the counter reflects high counts in these tracks, one would be able to identify that microorganism. As can be appreciated, the selection of materials to be used in the individual tracks is quite extensive. Thus, tapes are prepared for observation of certain types of bacteria with the tracks selected accordingly. The combinations and permutations with a multiple track tape, however, do provide for identification of a wide number of bacteria. The particular constituents utilized for the tape will be explained in more detail in the specific following description and drawings in which:

Figure 1:
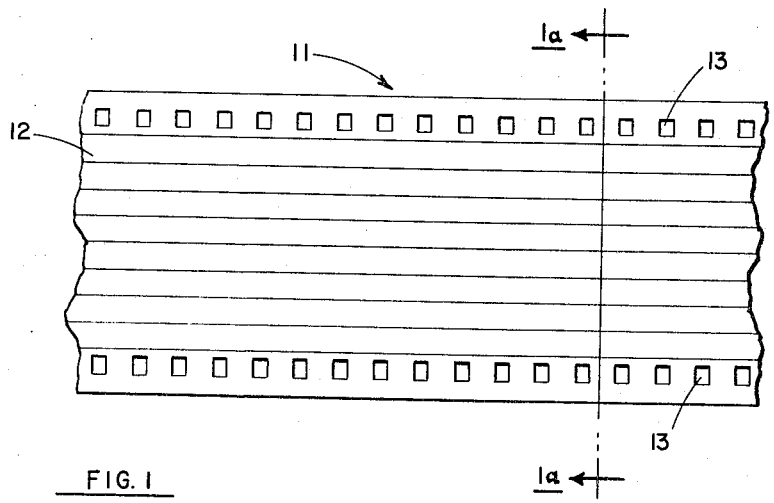
FIG. 1 is plan view of a tape of this invention.

The herein invention relies upon the measurement of immobilized cells, so as to obtain a rapid identification. As indicated, one prior art technique has utilized fluorescent antibodies and employed a microscopic observation of cells which have been immobilized on a supporting medium. However, the problem with the utilization of the antibody technique is that it is excessively specific for general use. Biochemical activity is slower than antibody stains and in the past has been used to measure product concentrations in a free solution. The herein invention in a way combines both techniques in that it utilizes biochemical activity, namely the enzymes, on immobilized bacteria in a gel formed on a moving tape, and then utilizes a fluorescent indicator which will visually reflect the enzymatic reaction that has occurred. With diffusion restricted by the gel, the fluors or fluorescent compounds will be localized near the cell in relatively high concentration, and each cell is represented by a discrete bright spot in a fluorescent microscope. Since fluorescence is increased in a high viscosity media such as agar gel or other similar gels that would be utilized, the spot resulting is brighter than would be expected from measurements in solution.

In order for the herein invention to successfully detect microorganisms, it is necessary that there exist enzymes or enzyme systems which are common to all microorganisms. The systems then must have the ability to effect changes in the media utilized. Further, these changes in the medium must be susceptible to ready detectability. All of the foregoing are readily available, as will be seen. The system of the herein inevntion is based upon the bacterial conversion of a fluorogenic substrate to a fluorescent product according to the following reaction:

the presence of the bacteria enzyme phosphase it will break down to fluorescein and phosphate, with the fluorescein being a fluorescent compound that is susceptible to ready observation. Thus, it can be seen in this type of reaction the enzyme causes a fluorescent material to be evolved in situ from a single substrate composition. In the other type of reaction involved, the compound CD, for example, will convert to $C+D$. However, neither C nor D will fluoresce but B will further react with compound Z to give a fluorescent compound, thus indicating the reaction having occurred in the presence of an enzyme. A specific example of this type is the amino acid, lysine. In the presence of the enzyme, lysine loses a molecule of $CO_2$. The remaining part of the lysine is then called cavaerine. This is a strongly basic material. The gel can thus have additionally incorporated in it a basic indicator, such as 4-methylumbelliferone, which will fluoresce in the presence of a strong base.

The other second basic approach is to determine general enzyme systems rather than specific enzymes as referred to above. The concept involved in this approach is that if a bacteria has a proper set of enzymes it will cause a reaction to occur with the material incorporated in the substrate. For example, lactose can be utilized in the gel substrate. If the bacteria has the proper set of enzymes it will use the lactose and produce acetic acid as a waste material. There would thus additionally be incorporated in the gel substrate an acid indicator which would fluoresce on the presence of the acetic acid. Such an acid indicator is quinine. Most of the material used in the enzyme system approach will require indicators in order to fluoresce.

Examples of materials that could be utilized to determine specific enzymes include amino acid decarboxylase including arginine, lysine, and ornithine, glycosidases, phosphatases, oxidases/dehydrogenases such as gluconic dehydrogenase and the like. In Table I are examples of enzymes, substrate materials that will be incorporated into the gel placed on the tapes of this invention, and the

TABLE I.—FLUOROGENIC ENZYME REACTIONS

| Enzymes | Substrates | Fluors |
| --- | --- | --- |
| Glycosidases | Fluorescein digalactoside | Fluorescein. |
| | 4-methyl umbelliferone galactoside | 4-methyl umbelliferone. |
| | 4-methyl umbelliferone glucoside (several other glycosides) | Do. |
| Glucuronidase | Umbelliferone glucuronide | Umbelliferone. |
| N-acetyl-β-glucosaminidase | 4-methyl umbelliferyl-N-acetyl-β-D-glucosaminide | 4-methyl umbelliferone. |
| Cholinesterases | Resorufin acetate | Resorufin. |
| | Resorufin butyrate | Do. |
| | Indoxyl acetate | Indoxyl. |
| Phosphatase | β-Naphthyl acid phosphate | β-Naphthol. |
| | 3-0-methyl fluorescein phosphate | 3-0-methyl fluorescein. |
| Lipase | Dibutyryl fluorescein | Fluorescein. |

Prior detection systems have employed bacterial enzymes and even fluorogenic substrates but, unlike the present invention, they were employed in solutions where the fluor was greatly diluted. The use of a gel on the tape in the herein system restricts diffusion so the fluor is concentrated in and around each bacterial cell. This provides a high signal/noise ratio and allows the number of active bacteria to be counted. Additionally, the high viscosity of the gel also increases the fluorescent yield. The herein invention, as other detection systems, is based upon the fact that all bacteria contain various enzymes. By detecting the enzymes one can in turn determine the bacteria.

There are two basic approaches in accord with this invention utilized to detect the enzymes. The first approach concerns the detection of individual or specific enzymes. Looking for the individual enzymes there are two types of substrates that can be utilized. The first type of substrate is a fluorogenic one which is a given chemical such as, for example, AB, that breaks down to $A+B$ when reacting with a specific enzyme. B, for example, would be fluorescent. A specific example of this type of compound would be fluorescein phosphate in the gel or agar material that would be utilized in the tape of the invention. In resulting fluorescent material when the substrate composition is broken down by the enzyme.

Often, however, it is easier to utilize a more common substrate material together with an indicator that will fluoresce. Many of the common reactions with the enzymes produce a change in pH or oxidation potential. As previously mentioned, one typical reaction would be lysine going to cadaverine utilizing a basic indicator. Another example would be malic acid which in the presence of the enzyme malic dehydrogenase goes to oxalacetic acid plus giving off hydrogen which is a reducing agent. Useful fluorescent pH indicators include luminol, 4-methyl umbelliferone, fluorescein, resorufin and quinine. Further, europium chelates are also applicable. Indicators which become fluorescent upon reduction include the coenzyme NADH (nicotinamide adenine dinucleotide), resazurin, methylene blue, indigo carmine, and the like.

The compounds which can be utilized in the substrate material that will break down to give a change of pH or produce a reducing agent, include carbohydrates and derivatives such as adonitol, arabinose, cellobiose, dulcitol, galactose, glucose, glycerol, glycogen, inositol, lactose, maltose, mannitol, melibiose, melezitose, raffinose, sorbitol, sorbose, starch, sucrose, trehalose, and xylose, or organic acids such as malonic and citric acid or their salts.

The foregoing discussion has been limited to two different means of achieving fluorescense, namely utilizing in the substrate a compound which will react with the enzyme and produce a fluorescent material in situ, and secondly, a compound that will break down to further react with an additional indicator compound to produce a fluorescent product. These are used for detecting either specific enzymes or enzyme systems. Further, some enzymes can react to give hydrogen sulfide. Cystine or cysteine with indicators such as Cobalt-Calcein Blue complex will indicate hydrogen-sulfide production by formation of cobalt sulfide, liberating the fluorescent Calcein Blue. Thus, from the foregoing one can readily appreciate that it is possible to determine the presence of specific enzymes in bacteria through fluorescence through a variety of approaches.

From a set of tests for enzyme activity or substrate utilization a key for classification or identification of the specific bacteria can be constructed. For example, a single reaction can serve to detect the presence of organisms. Two reactions can identify three classifications $++$, $+-$, $-+$ with the additional possible result of $\pm$ indicating the absence of organisms. It thus can be stated that a set of $n$ tests will provide ($2^n-1$) classification. For example, a four-track tape will produce 15 reactions, and an 8-track tape will produce 255 possible classifications. Thus, a tape having 8 separate tracks, each containing a different substrate indicator for identifying the different enzymes, might give a response to the type ($++$, $-+$, $--$, $+-$), which would serve to identify that tests culture as belonging to one particular class out of 255 possibilities. Obviously, using only 8 tracks it is not possible to identify all known bacteria, since there are more than 255 known species. However, it is possible to select reactions so that most nonpathogens are lumped into rather broad groups, while pathogens can be identified specifically.

Thus, with an eight-track tape for example, the given reaction pattern such as that mentioned above will define the classification. It should be obvious that any such reaction pattern is a statistical response involving a large number of potential organisms. Since the classification is a statistical result and since counts are available from each substrate channel, the system is able to solve the practical military problem of detection and identification of a sudden bacterial attack, or the hospital problem of the sudden presence of bacteria. For example, assume in an 8-track detector the mean background counts per track are:

300  300  400  200  100  200  400  300

If this response suddenly becomes:

700  600  400  500  100  200  700  300 it can be seen that significant changes have occurred in some but not all the channels. Since no response is equivalent to a "$-$" in the classification the pattern becomes $++$, $-+$, $--$, $+-$. This would clearly indicate the presence of the organism indicated in the previous example and the organism is not only detected but identified. The identification can be performed by inspection of a simple key chart. In this simple system the identification is relatively straightforward. However, where the pattern becomes more complex, such as determining the significance of lower counts, a simple computer can be employed in the system. Further, where in a theoretical bacterial warfare attack utilizing two or more species, in similar numbers, it would be fairly difficult to make a determination even utilizing the computer. However, there would be such an increase in almost all of the channels utilized that this should serve as a significant warning. If significantly different agents were utilized, a computer might be able to discern them.

Figure 2:
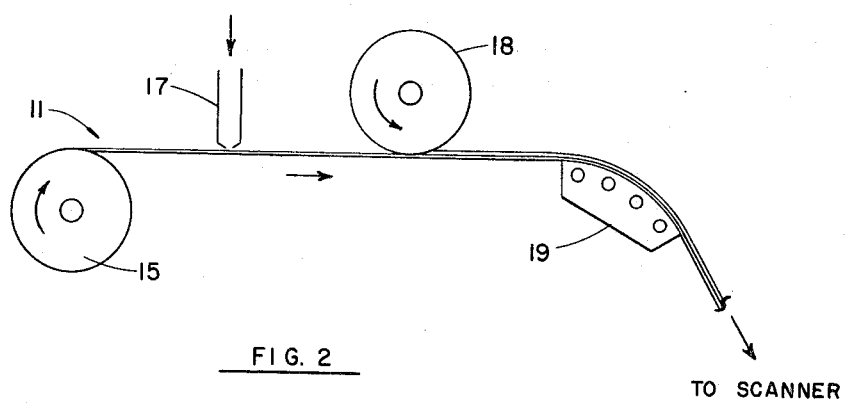
FIG. 2 is a schematic diagram of the detection process of this invention.
Figure 1A:
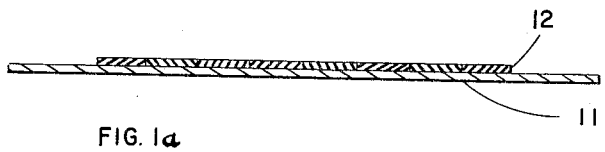
FIG. 1a is a cross-sectional view taken along line 1a—1a of FIG. 1.

Attention is directed to FIGS. 1 and 1a which discloses a tape 11 having a plurality of individual channels as numbered 1-8 thereon. The tape can be for example 35-mm. Mylar film, having apertures 13 along its edges for easy advancement. Each channel is comprised of a coating of suitable gel material 12 such as agar, containing a selected material which will react with an enzyme in a manner previously described. FIG. 2 schematically discloses a system for exposing the tape to the environment. The tape would be stored on a roll 15, then moved past a collector 17 which could be, for example, an air impactor. The collector can operate by impacting air on the tape or by filtering air or water through a membrane filter tape. It may be required to protect the sample from oxygen by applying a protective film from a source 18, or by flushing the film with an inert gas. The film is then directed to a heating block 19 where the tape is warmed to cause a rapid reaction between the enzymes and the various materials in the separate tracks. A temperature of 37° C. is typical of that required to speed the enzyme reactions. The heat chamber is constructed so that the resident time in the chamber is for several minutes. Instead of a chamber a heated block of Teflon or the like can be used. The rate of advancement of the tape in this system is on the order of a few inches per minute. Finally, as indicated by an arrow, after leaving the heating region the tape is directed to a scanner. Various systems are possible for scanning the tape. Systems that can be used are disclosed in an article "Quantitative Fluorescence Microscopy: Fluorescent Antibody Automatic Scanning Techniques," the Journal of Histochemistry and Cystochemistry, vol. 14, No. 3, by H. P. Mansberg and J. Kusnetz, pages 260-273. One can use a separate microscope objective for each track. Alternatively, a single large objective can possibly be utilized with a single scanning beam. Channel separation can be provided by proper timing. After the scanner, the tape is fed to a counting system which can be a visual counter or could include a computer which would be required to collect the counts for a preset period from each channel, compare counts with previous counts, compare the counts between channels, and use response patterns to identify organisms responsible for increased count, and finally provide necessary output signals.

In forming the gel coating for this invention, as indicated, the basic material could, for example, be agar which is normally used as a medium for bacterial growth. Other comparable gel materials include gelatin and cross-linked dextran.

The reactant incorporated in the gel is normally used in the range of about 0.1–1.0 weight percent of the gel. When an indicator is further required to cause fluorescence, the amount of indicator can be determined through a simple experimental procedure to obtain the amount required to give a sufficient indication for a suitable reading. Thus, one cannot state the exact amount of indicator required in this process where an indicator is needed. The preparation of a gel is relatively simple. A specific example would be as follows: Boil 100 ml. of water. To this there is added 2 grams of agar gelling agent, which is stirred until it is dissolved. To the mixture is added 2 grams of agar gelling agent, which is stirred until it is dissolved. To the mixture is added .20 gram of sodium citrate, which is acted upon by certain bacterial enzyme systems; .10 gram of dipotassium phosphate to maintain the pH or act as a buffer agent, .10 gram of mono ammonium phosphate which is also a buffer agent, and 10 mg. of indigo carmine which serves as an indicator. The composition is then cooled to 50° C. and coated on the tape. At 35° C. the material gels.

Following is a specific example of tape, showing its ability to determine the presence of certain species of bacteria.

EXAMPLE

Following is a list of the composition of the 8 tracks of a tape which can serve as will be seen from Table II to give an indication as to the presence of a particular species of bacteria. The materials listed are contained in an appropriate gelling agent and further have small amounts of buffers to maintain their pH:

(1) Sodium citrate, with indication provided by an agent that becomes fluorescent upon reduction, such as indigo carmine, which will serve to detect citrate utilization.

(2) Lactose, with indication by an agent fluorescing in a dilute acid, such as quinine, will serve to detect acid formation from lactose.

(3) Sucrose, with an acid indicator such as quinine.

(4) Mannitol, with an acid indicator such as quinine.

(5) Lysine, with a basic indicator such as 4-methyl umbelliferone, to show formation of cadaverine by bacterial lysine decarboxylase.

(6) Ornithine, with a basic indicator such as 4-methyl umbelliferone, to show formation of putrescine by bacterial ornithine decarboxylase.

(7) Sodium gluconate, with a reducing agent such as indigo carmine to show gluconate utilization.

(8) Cystine or cysteine, with an indicator such as cobalt-Calcein Blue complex, which will indicate hydrogen sulfide production by formation of cobalt sulfide, liberating the fluorescent Calcein Blue.

The following Table II will have an indication of the results from utilizing such a tape.

TABLE II

| Species | Disease caused | Citrate | Lactose | Sucrose | Mannitol | Lysine | Ornithine | Gluconate | $H_2S$ |
|---|---|---|---|---|---|---|---|---|---|
| Salmonella typhosa | Typhoid fever | − | − | − | + | + | − | − | + |
| Enterobacter aerogenes | | + | + | + | + | + | + | + | − |
| Shigella shigae | Dysentery | − | − | − | − | − | − | − | − |
| Pasteurella pestis | Plague | − | − | − | + | − | − | − | − |
| Vibrio comma | Cholera | ? | − | + | + | + | + | − | − |
| Serratia marcescens | | + | ± | + | + | + | + | + | − |
| Proteus vulgaris | | ± | − | + | − | − | − | − | + |

The specific description of this invention has been with relation to a multiple track tape wherein the tracks are run longitudinally the entire length of the tape. This obviously inherently limits the number of tracks on a tape. If one were, for example, desirous of increasing the tracks to 16 rather than 8, the tape would most likely have to be enlarged, since the width of an individual track must be sufficient to obtain a sample from the collector. In order to place more different tracks on a tape, the tracks can be disposed traversely in a series of stripes on the tape. Thus, for example, a sequence of 8 tracks or stripes will repeat itself successively throughout the entire length of a tape.

Further, it should be apparent that the underlying concept of this invention is not inherently limited to moving tapes, although they would appear to be the most feasible and convenient means for accomplishing the purpose of the invention. One could have, for example, a stack of plates. The plates would then be fed one at a time past the collector. Then the plates would be coated by a dispenser with the substrate compositions of this invention comprising the gel and the fluorogen composition therein. Each disc could be coated with a different composition. Alternatively, of course, the discs can be precoated before being subjected to the collector. Thus, it can be seen that the purpose of this invention can be accomplished without having continuous connected strips of different substrates. The main idea is to have continuous sampling using enough different substrates so that bacteria can be determined through the counting procedure above explained.

While the system of this invention has been described and illustrated in detail, it is to be clearly understood that this is intended by way of illustration an example only and is not to be taken by way of limitation, the spirit and scope of this invention being limited only by the terms of the following claims.

I claim:
1. The combination of (a) a tape used for detection of bacteria comprising:
   a film,
   a gel coating on said film,
   a plurality of adjacent tracks formed on said film, each track comprising said gel and a fluorogenic composition which will fluoresce when reacted with particular enzymes which can be present in bacteria, each track having a different composition than the others on said film and (b) a means for counting fluorescent spots on said tracks.

2. The tape of claim 1 wherein said fluorogenic composition in at least one of said tracks comprises:
   a compound which will break down to give a fluorescent product when metabolized by a specific enzyme.

3. The tape of claim 1 wherein said fluorogenic composition in at least one of said tracks comprises:
   a compound which will break down to give nonfluorescent products when metabolized by a specific enzyme,
   and a selected indicator which fluoresces only in the presence of one of the nonfluorescent products formed.

4. The tape of claim 1 wherein the fluorogenic composition in at least one of said tracks of said tape comprises:
   a compound which will be metabolized by a general enzyme system.

5. The tape of claim 4 wherein said composition further comprises:
   an indicator which fluoresces only in the presence of one of the products formed from the metabolization of said compound.

6. A method of detecting bacteria comprising:
   providing a substrate having a plurality of separate adjacent tracks each containing a gel and a different fluorogenic composition therein which can fluoresce when metabolized by certain bacterial enzymes,
   exposing said substrate to samples of an environment to be tested,
   allowing an incubation of the bacteria with said substrates whereby fluorescent spots can develop on the substrate,
   and detecting the number of fluorescent spots on each substrate.

7. The method of claim 6 comprising:
   moving said substrates continuously past an environmental sampler depositing said samples on different fresh portions of said substrates.

8. A method of detecting bacteria comprising:
   providing a tape having a plurality of tracks thereon, each track comprised of a gel and a different fluorogenic composition which can fluoresce when metabolized by bacterial enzymes,
   moving said tape past a collector which can deposit samples of an environment upon said tape,
   allowing an incubation of the bacteria with said substrates whereby fluorescent spots can develop on the substrate,
   and detecting the number of fluorescent spots on each track.

9. The method of claim 8 further comprising:
   heating said tape after said samples are deposited thereon to a temperature sufficient to increase the reaction rate.

10. The method of claim 8 further comprising:
protecting said tape from contamination after said samples are deposited thereon.

References Cited

UNITED STATES PATENTS 3,128,239  4/1964  Page _____ 195—103.5X

OTHER REFERENCES

Fluorescence Assay in Biology and Medicine, pp. 319–322 (1962).

Acid-Base Indicators, I. M. Kolthoff, p. 179 (1937).

Biochemical Detection Methods for Bacteria and Viruses, M. A. Mitz et al., 3rd Quarterly Progress Report, Melpar, Inc., pp. 6–10, 23, 24 (1963).

Mansberg, H. P. and Kusnetz, J.: Quantitative Fuoroscence Microscopy—Fluorescent Antibody Automatic Scanning Techniques, "J. Histochem and Cytochem," 14 (3): 260, 273 (1966).

ALVIN E. TANENHOLTZ, Primary Examiner

M. D. HENSLEY, Assistant Examiner

U.S. Cl. X.R.

195—100, 127

PO-1050
(5/69)

UNITED STATES PATENT OFFICE
CERTIFICATE OF CORRECTION

Patent No. 3,551,295　　　　　　　　Dated December 29, 1970

Inventor(s) D. L. DYER

It is certified that error appears in the above-identified patent and that said Letters Patent are hereby corrected as shown below:

In Column 1, Line 5, correct:

"Northrup" to --Northrop--.

Signed and sealed this 23rd day of March 1971.

(SEAL)
Attest:

EDWARD M. FLETCHER, JR.　　　　　　WILLIAM E. SCHUYLER, JR.
Attesting Officer　　　　　　　　　Commissioner of Patents